United States Patent
Zones et al.

(10) Patent No.: US 12,552,676 B2
(45) Date of Patent: Feb. 17, 2026

(54) MOLECULAR SIEVE SSZ-124, ITS SYNTHESIS AND USE

(71) Applicant: CHEVRON U.S.A. INC., San Ramon, CA (US)

(72) Inventors: Stacey Ian Zones, San Francisco, CA (US); Joel Edward Schmidt, Oakland, CA (US); Cong-Yan Chen, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 301 days.

(21) Appl. No.: 18/495,261

(22) Filed: Oct. 26, 2023

(65) Prior Publication Data

US 2024/0158246 A1   May 16, 2024

Related U.S. Application Data

(60) Provisional application No. 63/421,220, filed on Nov. 1, 2022.

(51) Int. Cl.
| | |
|---|---|
| *C01B 39/06* | (2006.01) |
| *B01J 29/04* | (2006.01) |
| *B01J 37/08* | (2006.01) |
| *C01B 39/02* | (2006.01) |
| *C01B 39/48* | (2006.01) |
| *C07C 4/06* | (2006.01) |

(52) U.S. Cl.
CPC ............. *C01B 39/06* (2013.01); *B01J 29/047* (2013.01); *B01J 37/082* (2013.01); *C01B 39/026* (2013.01); *C01B 39/48* (2013.01); *C07C 4/06* (2013.01); *B01J 2229/16* (2013.01); *B01J 2229/183* (2013.01); *C01P 2002/72* (2013.01); *C01P 2004/03* (2013.01); *C07C 2529/06* (2013.01)

(58) Field of Classification Search
CPC ...................................... B01J 29/047
See application file for complete search history.

(56) References Cited

U.S. PATENT DOCUMENTS

| | | | |
|---|---|---|---|
| 9,617,164 B2 * | 4/2017 | Corcoran, Jr. .......... | C01B 39/06 |
| 9,688,542 B2 * | 6/2017 | Corcoran, Jr. ....... | B01D 53/229 |
| 9,695,056 B2 * | 7/2017 | Corcoran, Jr. ....... | B01D 53/229 |
| 9,738,539 B2 * | 8/2017 | Corcoran, Jr. .......... | C01B 39/06 |
| 9,856,145 B2 | 1/2018 | Corma Canos et al. | |
| 10,384,951 B1 * | 8/2019 | Zones ..................... | B01J 29/70 |
| 2012/0275995 A1 * | 11/2012 | Davis .................... | C01B 37/005 |
| | | | 423/706 |
| 2016/0346771 A1 * | 12/2016 | Schmidt .................. | B01J 20/10 |
| 2017/0252729 A1 * | 9/2017 | Schmidt .................. | B01J 37/30 |

(Continued)

OTHER PUBLICATIONS

P.J. Bereciartua, A. Cantin, A. Corma, J.L. Jorda, M. Palomino, F. Rey, S. Valencia, E.W. Corcoran Jr., P. Kortunov, P.I. Ravikovitch, A. Burton, C. Yoon, Y. Wang, C. Paur, J. Guzman, A.R. Bishop and G.L. Casty "Control of zeolite framework flexibility and pore topology for separation of ethane and ethylene" Science 2017, 358, 1068-1071.

(Continued)

*Primary Examiner* — Ali Z Fadhel

(57) ABSTRACT

This disclosure relates to an aluminogermanosilicate molecular sieve, designated as SSZ-124, methods for making the same, and uses thereof.

4 Claims, 2 Drawing Sheets

(56) References Cited

U.S. PATENT DOCUMENTS

2019/0247835 A1\* 8/2019 Schmidt ............... B01J 37/0018
2023/0032494 A1\* 2/2023 Davis ................... B01J 37/0018

OTHER PUBLICATIONS

L. Bieseki, R. Simancas, J.L. Jorda, P.J. Bereciartua, A. Cantin, J. Simancas, S.B. Pergher, S. Valencia, F. Rey and A. Corma "Synthesis and structure determination via ultrafast electron diffraction of the new microporous zeolitic germanosilicate ITQ-62" Chem. Commun. 2018, 54, 2122-2125.

\* cited by examiner

MOLECULAR SIEVE SSZ-124, ITS SYNTHESIS AND USE

CROSS-REFERENCE TO RELATED APPLICATIONS

This application claims the priority benefit of U.S. Provisional Patent Application No. 63/421,220, filed Nov. 1, 2022, the disclosure of which is incorporated herein by reference.

FIELD

This disclosure relates to a new aluminogermanosilicate molecular sieve material, designated as SSZ-124, method of making same, and uses thereof.

BACKGROUND

Molecular sieve materials, both natural and synthetic, may be used as adsorbents and have catalytic properties for hydrocarbon conversion reactions. Certain molecular sieves, such as zeolites, are ordered, porous crystalline materials having a definite crystalline structure as determined by X-ray diffraction (XRD). Certain molecular sieves are ordered and produce specific identifiable XRD patterns. Within certain molecular sieve materials there may be a large number of cavities, which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes, (e.g., cracking, hydrocracking, disproportionation, alkylation, oligomerization, and isomerization).

Molecular sieves that find application in catalysis and adsorption include any of the naturally occurring or synthetic crystalline molecular sieves. Examples of these molecular sieves include large-pore zeolites, intermediate-pore size zeolites, and small-pore zeolites. These zeolites and their isotypes are classified by the Structure Commission of the International Zeolite Association (IZA) according to the rules of the IUPAC Commission on Zeolite Nomenclature. According to this classification, framework type zeolites and other crystalline microporous molecular sieves, for which a structure has been established, are assigned a three-letter code and are described in "*Atlas of Zeolite Framework Types*", eds. Ch. Baerlocher, L. B. McCusker, and D. H. Olson, Elsevier, Sixth Revised Edition, 2007, which is hereby incorporated by reference. These zeolites and their isotypes are also described in the "Database of Zeolite Structures" of the IZA Structure Commission.

Although many different crystalline molecular sieves have been discovered, there is a continuing need for new molecular sieves with desirable properties for gas separation and drying, organic conversion reactions, and other applications. New molecular sieves can contain novel internal pore architectures, providing enhanced selectivities in these processes.

SUMMARY

The present disclosure relates to aluminogermanosilicate molecular sieves, methods of making the same, and uses thereof.

In one embodiment, the present disclosure relates to a synthetic crystalline aluminogermanosilicate molecular sieve having, in its as-calcined form (e.g., where at least part of the structure directing agent has been removed), a powder X-ray diffraction pattern including at least the peaks listed in the following table:

| degree 2-theta [±0.20] | d-spacing [Å] | Relative Intensity [100 × I/(I$_o$)] |
|---|---|---|
| 9.33 | 9.48 | VS |
| 9.65 | 9.15 | M |
| 14.87 | 5.95 | M |
| 19.62 | 4.52 | M |
| 20.84 | 4.26 | S |
| 22.99 | 3.86 | VS |
| 26.34 | 3.38 | M |

In a second embodiment, the present disclosure relates to a synthetic crystalline aluminogermanosilicate molecular sieve having, in its as-synthesized form (e.g., where the structure directing agent has not been removed), a powder X-ray diffraction pattern including at least the peaks listed in the following table:

| degree 2-theta [±0.20] | d-spacing [Å] | Relative Intensity [(100 × I/(I$_o$)] |
|---|---|---|
| 8.84 | 9.99 | W |
| 9.25 | 9.56 | VS |
| 9.84 | 8.98 | W |
| 13.18 | 6.71 | W |
| 14.99 | 5.90 | M |
| 17.23 | 5.14 | W |
| 17.64 | 5.02 | M |
| 19.84 | 4.47 | M |
| 20.49 | 4.33 | M |
| 21.07 | 4.21 | S |
| 21.39 | 4.15 | S |
| 21.91 | 4.05 | VS |
| 23.06 | 3.85 | VS |
| 26.83 | 3.32 | M |

In a third embodiment, the present disclosure relates to a method of making an aluminogermanosilicate molecular sieve, the method comprising: (1) preparing a reaction mixture comprising: (a) an aluminosilicate molecular sieve having an FAU framework structure, (b) a source of germanium, (c) a structure directing agent comprising an $N^2,N^2,N^2,N^5,N^5,N^5$,3a,6a-octamethyloctahydropentalene-2,5-diammonium cation, (d) a source of fluoride ions, and (e) water; and (2) heating the reaction mixture to obtain an aluminogermanosilicate molecular sieve, wherein the aluminogermanosilicate molecular sieve has a different framework structure than the aluminosilicate molecular sieve.

In a fourth embodiment, the present disclosure relates to a process of converting an organic compound to a conversion product comprising contacting the organic compound with the aluminogermanosilicate molecular sieve according to the first or second embodiment or prepared according to the method of the third embodiment.

DETAILED DESCRIPTION

Figure 1A:
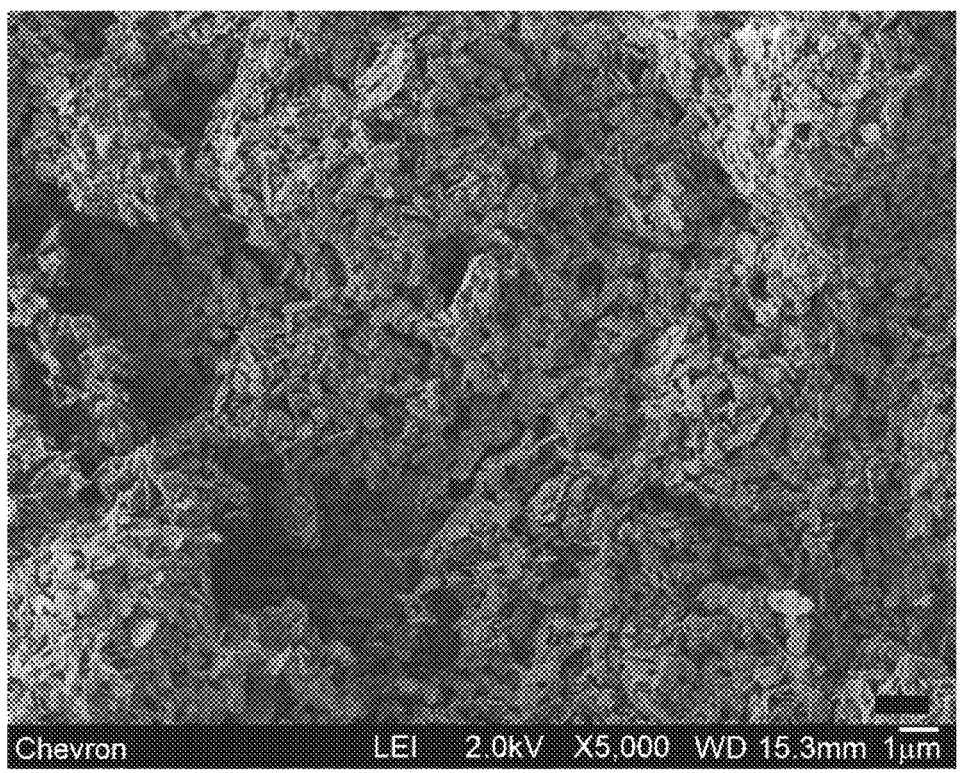
FIG. 1A and FIG. 1B show scanning electron microscopy (SEM) images of the as-synthesized product of Example 1 at different magnifications.

The present disclosure relates to aluminogermanosilicate molecular sieves, methods of making the same, and uses thereof. The aluminogermanosilicate molecular sieves may be designated as SSZ-124 molecular sieves or SSZ-124 materials.

Definitions

The term "aluminosilicate" means a molecular sieve material having a framework structure constructed of alumina and silica (i.e., repeating $AlO_4$ and $SiO_4$ tetrahedral units).

The term "aluminogermanosilicate" means a molecular sieve material having a framework structure constructed of alumina, germania and silica (i.e., repeating $AlO_4$, $GeO_4$ and $SiO_4$ tetrahedral units).

The term "FAU" refers to the FAU type topology or framework as recognized by the Structure Commission of the International Zeolite Association (IZA) and the term "FAU molecular sieve" means an aluminosilicate in which the primary crystalline phase is FAU.

The "as-synthesized" (or "as-made") aluminogermanosilicate molecular sieves of the present disclosure (i.e., before thermal treatment or other treatment to remove the structure directing agent from the pores) typically include the structure directing agent, one of the components of the reaction mixture, within their pores. The aluminogermanosilicate molecular sieves of the present disclosure where part or all of the structure directing agent has been removed (e.g., via thermal treatment or other treatment to remove the structure directing agent from the pores) are at least partially calcined or "as-calcined" materials.

Synthesis of the Molecular Sieve

In general, the aluminogermanosilicate molecular sieve of the present disclosure may be synthesized by: (1) preparing a reaction mixture comprising (a) an aluminosilicate molecular sieve having an FAU framework structure, (b) a source of germanium, (c) a structure directing agent [Q] comprising an $N^2,N^2,N^2,N^5,N^5,N^5$,3a,6a-octamethyloctahydropentalene-2,5-diammonium cation, (e) a source of fluoride ions, and (f) water; and (2) heating the reaction mixture to obtain an aluminogermanosilicate molecular sieve, wherein the aluminogermanosilicate molecular sieve has a different framework structure than the aluminosilicate molecular sieve.

The aluminogermanosilicate molecular sieve can be prepared from a reaction mixture having a composition, in terms of molar ratios, within the ranges shown in Table 1.

TABLE 1

| | Useful | Exemplary |
|---|---|---|
| $SiO_2/Al_2O_3$ | ≥50 | 100 to 500 |
| $SiO_2/GeO_2$ | 10 to 100 | 12 to 50 |
| $Q/(SiO_2 + GeO_2)$ | 0.05 to 0.60 | 0.10 to 0.50 |
| $F/(SiO_2 + GeO_2)$ | 0.40 to 0.60 | 0.40 to 0.60 |
| $H_2O/(SiO_2 + GeO_2)$ | 2 to 60 | 4 to 40 |

The aluminosilicate molecular sieve having an FAU framework structure can be single type of FAU molecular sieve or a mixture of two or more FAU molecular sieves. In certain embodiments, the FAU molecular sieve can be zeolite Y. The FAU molecular sieve can be two or more Y-zeolites having different silica-to-alumina molar ratios. The FAU molecular sieve can be in hydrogen form (H+ form), ammonium form (NH4+ form), or a combination of these forms.

Suitable sources of germanium include germanium oxide, germanium nitrate, and germanium alkoxides (e.g., tetraethoxygermanium).

Suitable sources of fluoride ions include one or more of hydrogen fluoride (HF), ammonium fluoride ($NH_4F$), and ammonium bifluoride ($NH_4HF_2$).

The structure directing agent [Q] comprises an $N^2,N^2,N^2,N^5,N^5,N^5$,3a,6a-octamethyloctahydropentalene-2,5-diammonium cation, represented by the following structure (1):

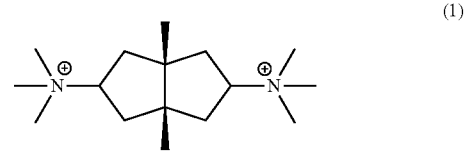

(1)

The structure directing agent [Q] may be present in any suitable form, for example as a halide, such as an iodide or a bromide, or as a hydroxide, for instance in its hydroxide form.

The synthesis may be performed with or without added nucleating seeds. If nucleating seeds are added to the synthesis mixture, the seeds may be of the same or of a different structure than the aluminogermanosilicate molecular sieve of the present disclosure, or SSZ-124 material, and may be present in an amount of from 0.1 to 10 wt. % based on 100 wt. % of $SiO_2$ in the framework structure of the aluminosilicate FAU molecular sieve, preferably from 0.5 to 5 wt. % based on 100 wt. % of $SiO_2$ in the framework structure of the aluminosilicate FAU molecular sieve.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

The reaction mixture is then subject to crystallization conditions suitable for the aluminogermanosilicate molecular sieve to form. Crystallization of the aluminogermanosilicate molecular sieve may be carried out under static or stirred conditions in a suitable reactor vessel, such as for example Teflon lined or stainless steel autoclaves placed in a convection oven maintained at an appropriate temperature.

The crystallization is typically carried out at a temperature of 100° C. to 200° C. (e.g., 120° C. to 170° C.), for a time sufficient for crystallization to occur at the temperature used. For instance, at higher temperatures, the crystallization time may be reduced. For instance, the crystallization conditions may include heating for a period of from 1 day to 30 days (e.g., 1 day to 14 days, or 1 day to 7 days). Preferably, the synthesis is carried out under autogenous pressure, preferably in an autoclave.

Typically, the aluminogermanosilicate molecular sieve is formed in solution and can be recovered by any well-known separation technique, such as, for example, decantation, filtration, ultrafiltration, centrifugation or any other solid-liquid separation technique, and combinations thereof. The recovered solids can then be washed with deionized or purified water and dried at an elevated temperature for several hours. The drying step can be performed under vacuum or at atmospheric pressure.

In the drying step, the water content is removed from the aluminogermanosilicate molecular sieve after the crystallization step or after the washing step. The conditions of the drying step are discretionary, but an example is drying the molecular sieve after the crystallization step or after the washing step by leaving the molecular sieve to stand for at least two hours (e.g., 4 to 24 hours) in an environment at a temperature not less than 50° C. and not greater than 150° C.

As a result of the crystallization process, the recovered as-synthesized molecular sieve product contains within its pores at least a portion of the structure directing agent used in the synthesis. The as-synthesized aluminogermanosilicate molecular sieve may thus be subjected to thermal treatment or other treatment to remove part or all of the structure directing agent incorporated into its pores during the synthesis. Thermal treatment (e.g., calcination) of the as-synthesized aluminogermanosilicate molecular sieve typically exposes the materials to high temperatures sufficient to remove part or all of the structure directing agent, preferably in an oxygen-containing atmosphere (e.g., air) in a furnace. The thermal treatment may be performed at a temperature of from 400° C. to 700° C. (e.g., 450° C. to 600° C.). The thermal treatment may be carried out for at least 1 hour and generally no longer than 20 hours (e.g., 2 to 10 hours, or 3 to 7 hours). The heating may first be carried out under a nitrogen atmosphere up to 400° C. and then the atmosphere may be switched to air at 400° C. to 700° C.

Characterization of the Molecular Sieve

The aluminogermanosilicate molecular sieve of the present disclosure can have a $SiO_2/Al_2O_3$ molar ratio of 50 or more (e.g., 50 to 500, or 100 to 500, or 50 to 250, or 100 to 250).

The aluminogermanosilictae molecular sieve of the present disclosure can have a $SiO_2/GeO_2$ molar ratio in a range of from 0.1 to 30 (e.g., 0.25 to 20, or 0.5 to 15, 5 to 10, or 1 to 5). $SiO_2/Al_2O_3$ and $SiO_2/GeO_2$ molar ratios of zeolites may be determined by conventional analysis.

The crystals of the aluminogermanosilicate molecular sieve can have a d50 crystal size of 5 μm or less (e.g., 0.5 μm to 5 μm).

The crystal size is based on individual crystals (including twinned crystals) but does not include agglomerations of crystals. Crystal size is the length of longest diagonal of the three-dimensional crystal. Direct measurement of the crystal size can be performed using microscopy methods, such as SEM and transmission electron microscopy (TEM). For example, measurement by SEM involves examining the morphology of materials at high magnifications (typically 1000× to 100,000×). The SEM method can be performed by distributing a representative portion of the molecular sieve powder on a suitable mount such that individual particles are reasonably evenly spread out across the field of view at 1000× to 100,000× magnification. From this population, a statistically significant sample of random individual crystals (e.g., 50-200) are examined and the longest diagonal of the individual crystals are measured and recorded. Particles that are clearly large polycrystalline aggregates should not be included the measurements. Based on these measurements, the d50 of the sample crystal sizes is calculated.

The as-synthesized aluminogermanosilicate molecular sieve (e.g., without thermal treatment) has a characteristic powder XRD pattern including at least the lines listed in Table 2.

TABLE 2

Characteristic Powder XRD Peaks for As-Synthesized SSZ-124

| degree 2-theta [±0.20] | d-spacing [Å] | Relative Intensity [(100 × I/(I$_o$)] |
| --- | --- | --- |
| 8.84 | 9.99 | W |
| 9.25 | 9.56 | VS |
| 9.84 | 8.98 | W |
| 13.18 | 6.71 | W |
| 14.99 | 5.90 | M |
| 17.23 | 5.14 | W |
| 17.64 | 5.02 | M |
| 19.84 | 4.47 | M |
| 20.49 | 4.33 | M |
| 21.07 | 4.21 | S |
| 21.39 | 4.15 | S |
| 21.91 | 4.05 | VS |
| 23.06 | 3.85 | VS |
| 26.83 | 3.32 | M |

The as-calcined aluminogermanosilicate molecular sieve (e.g., where at least part of the structure directing agent has been removed), has a characteristic powder XRD pattern including at least the peaks set forth in Table 3.

TABLE 3

Characteristic Powder XRD Peaks for As-Calcined SSZ-124

| degree 2-theta [±0.20] | d-spacing [Å] | Relative Intensity [100 × I/(I$_o$)] |
| --- | --- | --- |
| 9.33 | 9.48 | VS |
| 9.65 | 9.15 | M |
| 14.87 | 5.95 | M |
| 19.62 | 4.52 | M |
| 20.84 | 4.26 | S |
| 22.99 | 3.86 | VS |
| 26.34 | 3.38 | M |

The powder X-ray diffraction patterns were determined by standard techniques. The radiation was the K-alpha/doublet of copper and a scintillation counter spectrometer with a strip-chart pen recorder was used. The peak heights, I, and their positions, in degrees, 2-theta (2θ), where θ is the Bragg angle, were read from the spectrometer chart. From these measured values, the relative intensities, 100 I/I$_0$, where I$_0$ is the intensity of the strongest line or peak, and d, the interplanar spacing in Angstroms corresponding to the recorded lines, can be calculated. The relative intensity is based on the strongest line in the X-ray pattern which is assigned a value of 100. The relative intensities are given in terms of the symbols VS=very strong (greater than 60 to 100), S=strong (greater than 40 to 60), M=medium (greater than 20 to 40), and W=weak (less than 20). The reported d-spacing values have a deviation determined based on the corresponding deviation ±0.20 degree 2-theta when converted to the corresponding values for d-spacing using Bragg's law.

Minor variations in the diffraction pattern values in the tables or the figures can occur as a result of variations, for example, in the nature and degree of pore filling, framework composition, and crystal size and shape. Notwithstanding these minor perturbations, the basic crystal structures for the as-made and as-calcined materials remain substantially unchanged.

The aluminogermanosilicate molecular sieve of the present disclosure may contain impurities, such as amorphous materials, unit cells having different topologies (e.g., quartz or molecular sieves of different framework type, that may or may not impact the performance of the resulting catalyst), and/or other impurities (e.g., heavy metals and/or organic hydrocarbons). The alumingermanosilicate molecular sieve of the present disclosure is preferably substantially free of impurities. The term "substantially free of impurities" (or in the alternative "substantially pure") used herein means the aluminogermanosilicate molecular sieve contains a minor proportion (less than 50 wt. %), preferably less than 20 wt. %, more preferably less than 10 wt. %, even more preferably less than 5 wt. % and most preferably less than 1 wt. % (e.g., less than 0.5 wt. % or 0.1 wt. %), of such impurities, which weight percent (wt. %) values are based on the combined weight of impurities and pure aluminogermanosilicate molecular sieve. The amount of impurities can be appropriately determined by powder XRD, rotating electron diffraction, and/or SEM/TEM (e.g., different crystal morphologies).

The aluminogermanosilicate molecular sieves described herein are substantially crystalline. As used herein, the term "crystalline" refers to a crystalline solid form of a material, including a single-component or multiple-component crystal form (e.g., including solvates, hydrates, and a co-crystal). Crystalline can mean having a regularly repeating and/or ordered arrangement of molecules and possessing a distinguishable crystal lattice. For example, the aluminogermanosilicate molecular sieve can have different water or solvent content. The different crystalline lattices can be identified by solid state characterization methods such as by XRD (e.g., powder XRD). Other characterization methods known to a person of ordinary skill in the relevant art can further help identify the crystalline form as well as help determine stability and solvent/water content. As used herein, the term "substantially crystalline" means a majority (greater than 50 wt. %) of the weight of a sample of a material described is crystalline and the remainder of the sample is a non-crystalline form. In one or more aspects, a substantially crystalline sample has at least 95% crystallinity (e.g., 5% of the non-crystalline form), at least 96% crystallinity (e.g., 4% of the non-crystalline form), at least 97% crystallinity (e.g., 3% of the non-crystalline form), at least 98% crystallinity (e.g., 2% of the non-crystalline form), at least 99% crystallinity (e.g., 1% of the non-crystalline form), and 100% crystallinity (e.g., 0% of the non-crystalline form).

Uses of the Aluminogermanosilicate Molecular Sieve

The aluminogermanosilicate molecular sieve of the present disclosure, where part or all of the structure directing agent has been removed, may be used as an adsorbent or as a catalyst or support for catalyst in a wide variety of hydrocarbon conversions (e.g., conversion of organic compounds to a converted product). Therefore, the present disclosure therefore relates to the use of the aluminogermanosilicate molecular sieve as described herein as an adsorbent or as a catalyst or support for catalyst in hydrocarbon conversions. The present disclosure also relates to a process of converting an organic compound to a conversion product which comprises contacting the organic compound with the aluminogermanosilicate molecular sieve as described herein.

The aluminogermanosilicate molecular sieve of the present disclosure (where part or all of the structure directing agent is removed) may be used as an adsorbent, such as for separating at least one component from a mixture of components in the vapor or liquid phase having differential sorption characteristics with respect to the material. Therefore, at least one component can be partially or substantially totally separated from a mixture of components having differential sorption characteristics with respect to the aluminogermanosilicate molecular sieve by contacting the mixture with the aluminogermanosilicate molecular sieve to selectively sorb the one component. For instance, in a process for selectively separating one or more desired components of a feedstock from remaining components of the feedstock, the feedstock may be contacted with a sorbent that comprises the aluminogermanosilicate molecular sieve of the present disclosure at effective sorption conditions, thereby forming a sorbed product and an effluent product. One or more of the desired components are recovered from either the sorbed product or the effluent product.

The aluminogermanosilicate molecular sieve of the present disclosure (where part or all of the structure directing agent is removed) may also be used as a catalyst to catalyze a wide variety of organic compound conversion processes. Examples of chemical conversion processes, which are effectively catalyzed by the aluminogermanosilicate molecular sieve described herein, either alone or in combination with one or more other catalytically active substances including other crystalline catalysts, include those requiring a catalyst with acid activity. Examples of organic conversion processes, which may be catalyzed by the aluminogermanosilicate molecular sieve described herein include cracking, hydrocracking, isomerization, oligomerization, polymerization, reforming, hydrogenation, dehydrogenation, dewaxing, hydrodewaxing, alkylation, transalkylation, dealkylation, disproportionation, hydrodecyclization, dehydrocyclization, methanol-to-olefins conversion, deNO$_x$ applications, and combinations thereof. The conversion of hydrocarbon feeds can take place in any convenient mode, for example in fluidized bed, moving bed, or fixed bed reactors depending on the types of process desired.

The aluminogermanosilicate molecular sieve of the present disclosure may be formulated into product compositions by combination with other materials, such as binders and/or matrix materials that provide additional hardness to the finished product. These other materials can be inert or catalytically active materials.

For instance, it may be desirable to incorporate the aluminogermanosilicate molecular sieve of the present disclosure with another material that is resistant to the temperatures and other conditions employed during use. Such materials include synthetic or naturally occurring zeolites as well as inorganic materials such as clays, silica and/or metal oxides such as alumina and mixtures thereof. The metal oxides may be either naturally occurring or in the form of gelatinous precipitates or gels including mixtures of silica and metal oxides. Use of a resistant material in conjunction with the aluminogermanosilicate molecular sieve of the present disclosure (i.e., combined therewith or present during synthesis of the as-synthesized aluminogermanosilicate molecular sieve) which crystal is active, tends to change the conversion and/or selectivity of the catalyst in certain organic conversion processes. Inactive resistant materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the product under commercial operating conditions. These inactive resistant materials (i.e., clays, oxides, etc.) function as binders for the catalyst. A catalyst having good crush strength can be beneficial because in commercial use, it is desirable to prevent the catalyst from breaking down into powder-like materials.

Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. Binders useful for compositing with the aluminogermanosilicate molecular sieve of the present disclosure also include inorganic oxides selected from silica, zirconia, titania, magnesia, beryllia, alumina, yttria, gallium oxide, zinc oxide, and mixtures thereof.

In addition to the foregoing materials, the aluminogermanosilicate molecular sieve of the present disclosure may be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

These binder materials are resistant to the temperatures and other conditions (e.g., mechanical attrition) which occur in various hydrocarbon conversion processes. Thus, the aluminogermanosilicate molecular sieve of the present disclosure may be used in the form of an extrudate with a binder. They are typically bound by forming a pill, sphere, or extrudate. The extrudate is usually formed by extruding the molecular sieve, optionally in the presence of a binder, and drying and calcining the resulting extrudate. Further treatments such as steaming, and/or ion-exchange may be carried out as required. The molecular sieve may optionally be bound with a binder having a surface area of at least 100 $m^2/g$ (e.g., at least 200 $m^2/g$, or at least 300 $m^2/g$).

The relative proportions of aluminogermanosilicate molecular sieve and inorganic oxide matrix may vary widely, with the aluminogermanosilicate molecular sieve content ranging from 1 to 99% by weight and more usually, particularly when the composite is prepared in the form of extrudates, in the range of from 2 to 95% by weight, optionally from 20 to 90% by weight of the composite.

EXAMPLES

The following illustrative examples are intended to be non-limiting.

Example 1

Into a tared cup with cap with cap weight added, 2.5 mmoles of $N^2,N^2,N^2,N^5,N^5,N^5$,3a,6a-octamethyloctahydropentalene 2,5-diammonium dihydroxide was added along with the following solids: 0.27 grams of Tosoh 390HUA Y-zeolite (H$^+$-form, $SiO_2/Al_2O_3$ molar ratio=500) and 0.05 grams of $GeO_2$. The mixture was placed in a fume hood to evaporate down to a mix mass of 1.50 grams. Then, 0.10 grams of 48% HF (2.5 mmoles) was added. The reaction vessel was then capped and sealed within a steel Parr autoclave and heated in a convection oven at 160° C. with rotation (43 rpm) for 6 days. The product was recovered by centrifugation, washed with deionized water and dried at 95° C.

Powder XRD analysis of the as-synthesized material showed the material to have a unique powder XRD pattern which could not be matched with any known molecular sieve and was designated as pure as-synthesized SSZ-124 product.

Figure 1B:
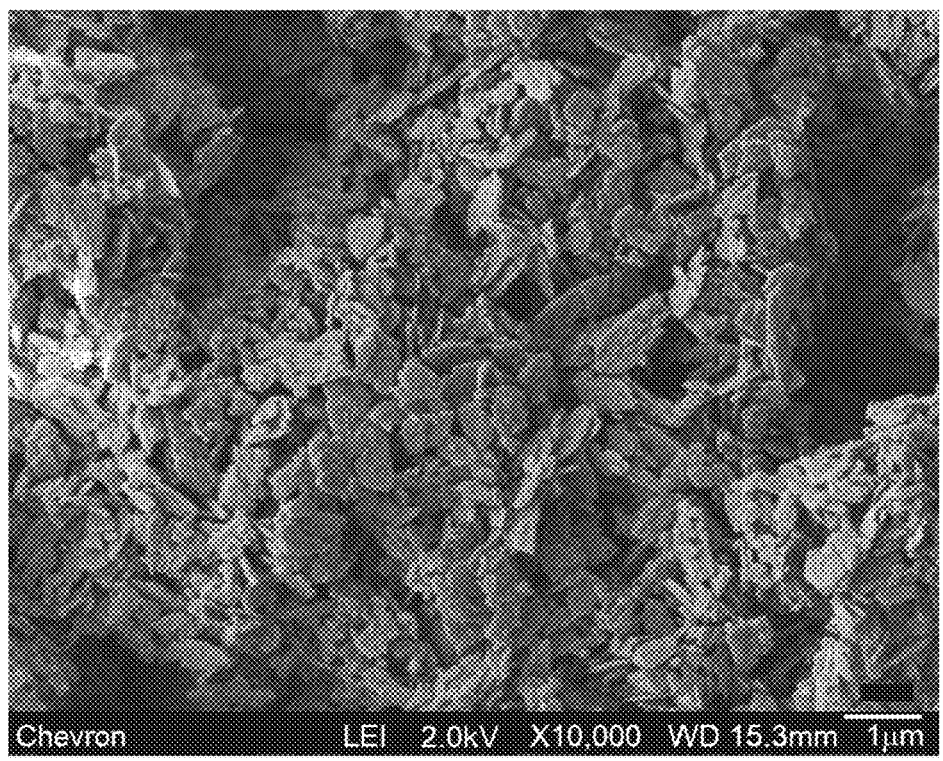

SEM images of the product shown in FIG. 1A and FIG. 1B, indicating a uniform field of crystals.

Figure 2:
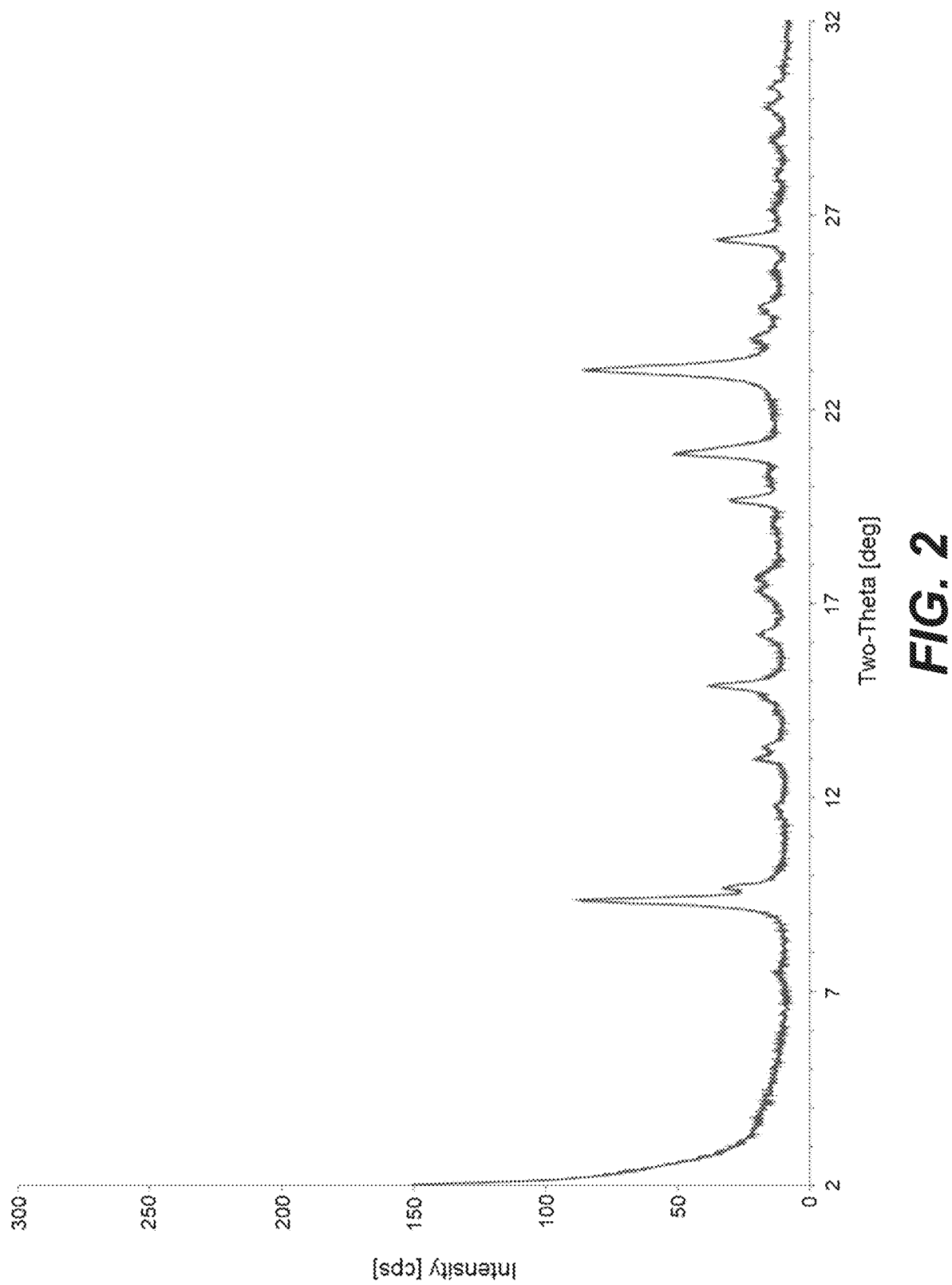
FIG. 2 shows a powder X-ray diffraction (XRD) pattern of the calcined molecular sieve product of Example 1.

A sample of the as-made product was calcined inside a muffle furnace under a flow of air by heating the sample from room temperature to 540° C. at a 1° C./min heating rate and maintaining the temperature at 540° C. for 6 h. FIG. 2 shows the powder XRD pattern of the as-calcined product.

$N^2$ adsorption measurements of the calcined product showed that the product had a BET surface area of 204 $m^2/g$ and a micropore volume of 0.0749 $cm^3/g$.

Example 2

Into a tared cup with cap weight added, 7.5 mmoles of $N^2,N^2,N^2,N^5,N^5,N^5$,3a,6a-octamethyloctahydropentalene 2,5-diammonium dihydroxide was added along with the following solids: 0.40 grams of Tosoh 390HUA Y-zeolite, 0.40 grams of Zeolyst CBV600 Y-zeolite (H$^+$-form, $SiO_2/Al_2O_3$ molar ratio=60) and 0.15 grams of $GeO_2$. The mixture was placed in a fume hood to evaporate down to a mix mass of 4.50 grams. Then, 0.30 grams of 48% HF (7.5 mmoles) was added. The reaction vessel was then capped and sealed within a steel Parr autoclave and heated in a convection oven at 160° C. with rotation (43 rpm) for 6 days. The product was recovered by centrifugation, washed with deionized water and dried at 95° C.

The as-synthesized product was calcined at 540° C. for 6 hours in air with a ramping rate of 1° C./min.

Powder XRD analysis of the as-made and calcined products indicated that pure SSZ-124 products were obtained.

Analysis by inductively coupled plasma atomic emission spectroscopy (ICP-AES) showed the calcined product to have a $SiO_2/GeO_2$ molar ratio of 11.

As determined by n-propylamine temperature-programmed desorption, the calcined product has Brønsted acidity of 264.84 mmol/g, indicating that aluminum sites are incorporated into the framework of the molecular sieve.

Example 3

Constraint Index

The Constraint Index is a test to determine shape-selective catalytic behavior in zeolites. It compares the reaction rates for the cracking of n-hexane (n-C6) and its isomer 3-methylpentane (3-MP) under competitive conditions (see V. J. Frillette et al., *J. Catal.* 1991, 67, 218-222).

The calcined molecular sieve of Example 2 was pelletized at 4 kpsi, crushed and granulated to 20-40 mesh. A 0.6 g sample of the granulated material was calcined in air at 540° C. for 4 hours and cooled in a desiccator to ensure dryness. Then, 0.47 g of material was packed into a ¼ inch stainless steel tube with alundum on both sides of the zeolite bed. A furnace (Applied Test Systems, Inc.) was used to heat the reactor tube. Nitrogen was introduced into the reactor tube at 9.4 mL/min and at atmospheric pressure. The reactor was heated to about 900° F. (482° C.), and a 50/50 feed of n-hexane and 3-methylpentane was introduced into the reactor at a rate of 8 μL/min. The feed was delivered by an ISCO pump. Direct sampling into a GC began after 15 minutes of feed introduction.

Test data results after 136 minutes on stream (900° F.) are presented in Table 4.

TABLE 4

| Constraint Index Test | |
| --- | --- |
| n-C6 Conversion [%] | 8.2 |
| 3-MP Conversion [%] | 1.3 |
| Feed Conversion [%] | 4.7 |
| Constraint Index (excluding 3-MP) | 6.45 |
| Constraint Index (including 3-MP) | 6.45 |

The invention claimed is:

1. An aluminogermanosilicate molecular sieve having, in its as-calcined form, a powder X-ray diffraction pattern including the following lines:

| degree 2-theta [±0.20] | d-spacing [Å] | Relative Intensity [100 × I/(I$_o$)] |
| --- | --- | --- |
| 9.33 | 9.48 | VS |
| 9.65 | 9.15 | M |
| 14.87 | 5.95 | M |
| 19.62 | 4.52 | M |
| 20.84 | 4.26 | S |
| 22.99 | 3.86 | VS |
| 26.34 | 3.38 | M. |

2. An aluminogermanosilicate molecular sieve as in claim 1, the aluminogermanosilicate molecular sieve has a SiO$_2$/Al$_2$O$_3$ molar ratio of 50 to 500 and a SiO$_2$/GeO$_2$ molar ratio of 0.1 to 30.

3. An aluminogermanosilicate molecular sieve as in claim 1, the aluminogermanosilicate molecular sieve has a SiO$_2$/Al$_2$O$_3$ molar ratio of 100 to 250 and a SiO$_2$/GeO$_2$ molar ratio of 0.5 to 15.

4. A process for converting an organic compound to a conversion product comprises contacting the organic compound with the aluminogermanosilicate molecular sieve of claim 1.

* * * * *